United States Patent
Lin et al.

(10) Patent No.: US 8,953,507 B2
(45) Date of Patent: Feb. 10, 2015

(54) FREQUENCY AND TIME DOMAIN RANGE EXPANSION

(75) Inventors: Dexu Lin, San Diego, CA (US); Ravi Palanki, San Diego, CA (US); Wanshi Chen, San Diego, CA (US); Aleksandar Damnjanovic, San Diego, CA (US); Tingfang Ji, San Diego, CA (US); Aamod Dinkar Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 13/024,213

(22) Filed: Feb. 9, 2011

(65) Prior Publication Data

US 2011/0194527 A1    Aug. 11, 2011

Related U.S. Application Data

(60) Provisional application No. 61/303,622, filed on Feb. 11, 2010.

(51) Int. Cl.
*H04B 7/00* (2006.01)
*H04B 7/02* (2006.01)
(Continued)

(52) U.S. Cl.
CPC ............. *H04B 7/022* (2013.01); *H04W 52/244* (2013.01); *H04W 52/325* (2013.01);
(Continued)

(58) Field of Classification Search
CPC ..... H04W 52/04; H04W 52/06; H04W 52/14; H04W 52/16; H04W 52/243; H04W 52/244

USPC .......... 370/310, 328–330, 339–345; 455/422, 455/443, 444, 446, 522
See application file for complete search history.

(56) References Cited

U.S. PATENT DOCUMENTS 7,142,861 B2 * 11/2006 Murai ............................ 455/444
7,860,150 B2 * 12/2010 Tiirola et al. .................. 375/135
(Continued)

FOREIGN PATENT DOCUMENTS

| JP | 2001024580 A | 1/2001 |
| JP | 2007129405 A | 5/2007 |

(Continued)

OTHER PUBLICATIONS

International Search Report and Written Opinion—PCT/US2011/024371—ISA/EPO—Jun, 9, 2011.
(Continued)

*Primary Examiner* — Dmitry H Levitan
(74) *Attorney, Agent, or Firm* — Dalei Dong

(57) ABSTRACT

For range expansion, a determination to enter range expansion may be made based on a signal strength differential for user equipment (UE) communications between a first class of base stations and a second class of base stations. If the signal strength differential is beyond a certain threshold, range expansion may be implemented. In range expansion, a signal is transmitted, on a resource coordinated with at least one of the first class of base stations, from one of the second class of base stations to the UE which could experience dominant interference from one of the first class of base stations if coordination were not performed. Transmission power may be reduced from one of the first class of base stations on that resource. The second signal may be transmitted within the region of the Physical Downlink Shared Channel.

22 Claims, 8 Drawing Sheets

(51) Int. Cl.

| | | |
|---|---|---|
| *H04W 52/24* | (2009.01) | |
| *H04W 52/32* | (2009.01) | |
| *H04B 7/26* | (2006.01) | |
| *H04B 17/00* | (2006.01) | |
| *H04W 8/22* | (2009.01) | |
| *H04W 16/32* | (2009.01) | |
| *H04W 28/04* | (2009.01) | |
| *H04W 52/14* | (2009.01) | |
| *H04W 56/00* | (2009.01) | |
| *H04W 72/08* | (2009.01) | |
| *H04W 84/04* | (2009.01) | |

(52) U.S. Cl.
CPC ...... *H04W 72/12341* (2013.01); *H04B 7/2606* (2013.01); *H04B 17/0057* (2013.01); *H04W 8/22* (2013.01); *H04W 16/32* (2013.01); *H04W 28/04* (2013.01); *H04W 52/143* (2013.01); *H04W 56/00* (2013.01); *H04W 72/082* (2013.01); *H04W 84/047* (2013.01); *Y02B 60/50* (2013.01)
USPC ........................................................ 370/310

(56) References Cited

U.S. PATENT DOCUMENTS

| | | | | |
|---|---|---|---|---|
| 7,912,115 | B2* | 3/2011 | Zhao et al. | 375/219 |
| 8,050,629 | B2* | 11/2011 | Foster et al. | 455/63.1 |
| 8,489,028 | B2* | 7/2013 | Bhattad et al. | 455/63.1 |
| 2009/0221295 | A1* | 9/2009 | Sahin et al. | 455/450 |
| 2009/0227263 | A1 | 9/2009 | Agrawal et al. | |
| 2009/0253461 | A1* | 10/2009 | Kuwahara | 455/561 |
| 2009/0290550 | A1 | 11/2009 | Bhattad et al. | |
| 2009/0296641 | A1* | 12/2009 | Bienas et al. | 370/329 |
| 2009/0325626 | A1 | 12/2009 | Palanki et al. | |
| 2010/0008317 | A1 | 1/2010 | Bhattad et al. | |
| 2010/0009634 | A1* | 1/2010 | Budianu et al. | 455/63.1 |
| 2010/0111022 | A1* | 5/2010 | Chang et al. | 370/329 |
| 2010/0136996 | A1* | 6/2010 | Han et al. | 455/452.1 |
| 2010/0137016 | A1 | 6/2010 | Voyer | |
| 2011/0170496 | A1* | 7/2011 | Fong et al. | 370/329 |

FOREIGN PATENT DOCUMENTS

| | | |
|---|---|---|
| WO | 2006112764 A1 | 10/2006 |
| WO | WO-2009143382 | 11/2009 |
| WO | WO2010037571 | 4/2010 |

OTHER PUBLICATIONS

Qualcomm Europe: "Range expansion for efficient support of heterogeneous networks" 3GPP Draft; R1-083813, 3rd Generation Partnership Project (3GPP), Mobile Competence Centre; 650, Route Des Lucioles; F-06921 Sophia-Antipolis Cedex; France, no. Prague, Czech Republic; (Sep. 29-Oct. 3, 2008), Sep. 24, 2008, XP050317137.

Qualcomm Incorporated: "LTE Advanced: Heterogeneous Networks", Feb. 1, 2010, pp. 1-10, XP002638714, Retrieved from the Internet: URL:http://www.qualcomm.com/documents/files/lte-advanced-heterogeneous-networks.pdf [retrieved on May 25, 2011].

Taiwan Search Report—TW100104445—TIPO—Sep. 12, 2013.

"Techniques to cope with high interference in HetNets", 3GPP TSG-RAN WG1 #59 R1-094883, Nov. 16, 2009, URL: http://www.3gpp.org/ftp/tsg_ran/WG1_RL1/TSGR1_59/Docs/R1-.094883.zip.

* cited by examiner

FREQUENCY AND TIME DOMAIN RANGE EXPANSION

CROSS REFERENCE TO RELATED APPLICATION

This application claims the benefit of U.S. provisional patent application No. 61/303,622 filed Feb. 11, 2010, in the names of LIN et al., the disclosure of which is expressly incorporated herein by reference in its entirety.

BACKGROUND

1. Field

The present disclosure relates generally to communication systems, and more particularly, to frequency and time domain range expansion.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

A method for wireless communication is offered. The method includes processing information from a user equipment (UE) to obtain a signal strength difference between UE communications with at least one of a first class of base stations and UE communications with at least one of a second class of base stations relative to a predetermined threshold. The method also includes scheduling the UE in a range expansion mode based on the signal strength difference relative to the predetermined threshold. The range expansion mode enables the UE to receive communications from at least one of the second class of base stations on a resource coordinated with at least one of the first class of base stations.

An apparatus operable for wireless communication is offered. The apparatus includes means for processing information from a user equipment (UE) to obtain a signal strength difference between UE communications with at least one of a first class of base stations and UE communications with at least one of a second class of base stations relative to a predetermined threshold. The apparatus also includes means for scheduling the UE in a range expansion mode based on the signal strength difference relative to the predetermined threshold. The range expansion mode enables the UE to receive communications from at least one of the second class of base stations on a resource coordinated with at least one of the first class of base stations.

A computer program product operable to wirelessly transmit data over a communications link is offered. The computer program product includes a computer-readable medium having program code recorded thereon. The program code includes program code to process information from a user equipment (UE) to obtain a signal strength difference between UE communications with at least one of a first class of base stations and UE communications with at least one of a second class of base stations relative to a predetermined threshold. The program code also includes program code to schedule the UE in a range expansion mode based on the signal strength difference relative to the predetermined threshold. The range expansion mode enables the UE to receive communications from at least one of the second class of base stations on a resource coordinated with at least one of the first class of base stations.

An apparatus operable to wirelessly transmit data over a communications link is offered. The apparatus includes a processor(s) and a memory coupled to the processor(s). The processor(s) is configured to process information from a user equipment (UE) to obtain a signal strength difference between UE communications with at least one of a first class of base stations and UE communications with at least one of a second class of base stations relative to a predetermined threshold. The processor(s) is also configured to schedule the UE in a range expansion mode based on the signal strength difference relative to the predetermined threshold. The range expansion mode enables the UE to receive communications from at least one of the second class of base stations on a resource coordinated with at least one of the first class of base stations.

DETAILED DESCRIPTION

Figure 1:
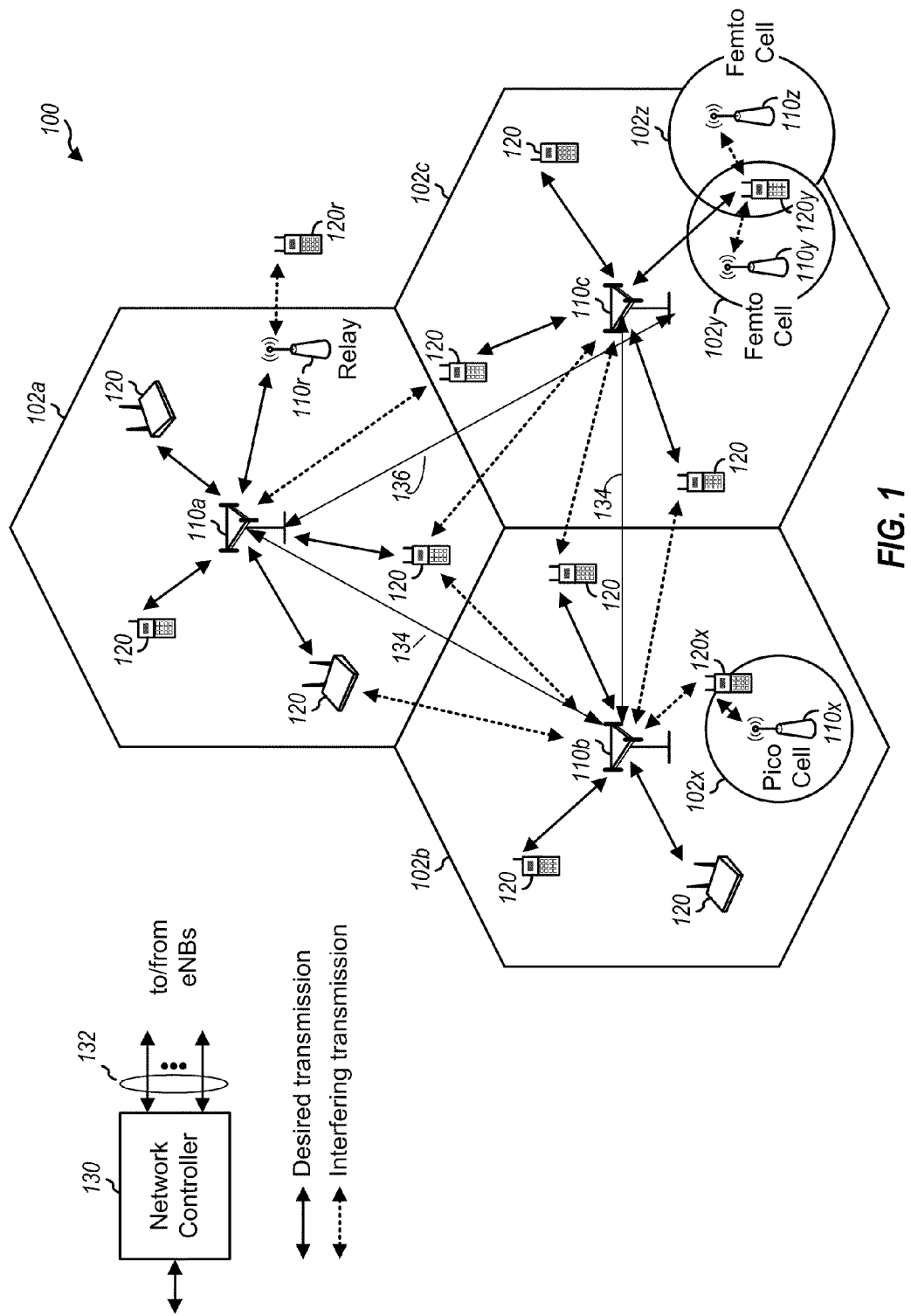
FIG. 1 is a block diagram conceptually illustrating an example of a mobile communication system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell (also known as a remote radio head (RRH) or hotzone cell) would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 also includes relay base stations. A relay base station (also called a relay station) is a station that receives a transmission of data and/or other information from an upstream station (e.g., an eNodeB, a UE, or the like) and sends a transmission of the data and/or other information to a downstream station (e.g., another UE, another eNodeB, or the like). A relay station may also be a UE that relays transmissions for other UEs. In the example shown in FIG. 1, a relay station 110r may communicate with the eNodeB 110a and a UE 120r, in which the relay station 110r acts as a relay between the two network elements (the eNodeB 110a and the UE 120r) in order to facilitate communication between them. A relay station may also be referred to as a relay eNodeB, a relay, and the like.

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul 132. The eNodeBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a tablet, a notebook computer, a cordless phone, a wireless local loop (WLL) station, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB. According to an aspect of the present disclosure, a UE 120 communicating with a base station 110a hands over to a base station 110b without the base station 110a first preparing the base station 110b for the handover. Such a handover will be referred to as a "forward handover."

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10 or 20 MHz, respectively.

Figure 2:
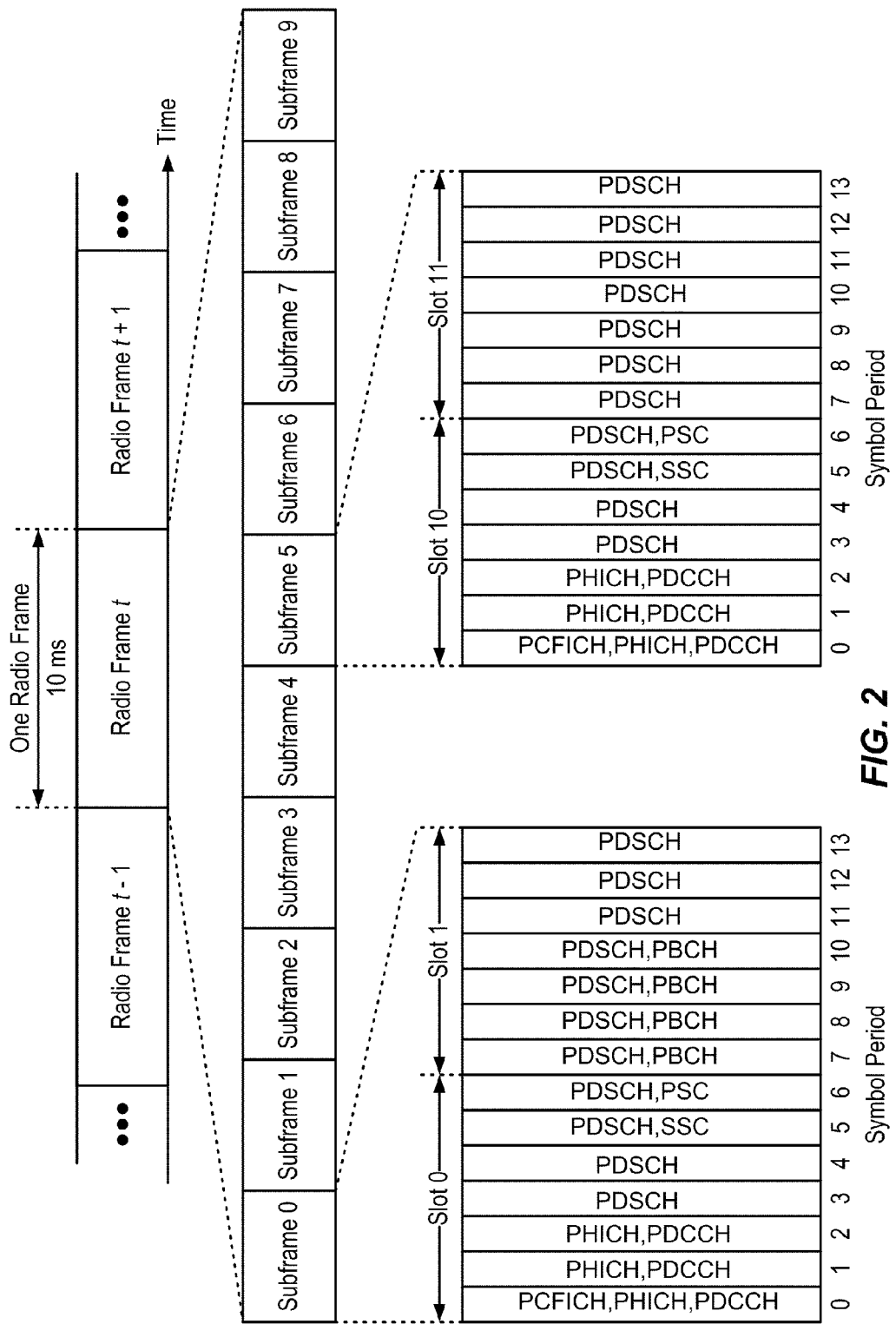
FIG. 2 is a block diagram conceptually illustrating an example of a downlink frame structure in a mobile communication system.

FIG. 2 shows a downlink FDD frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
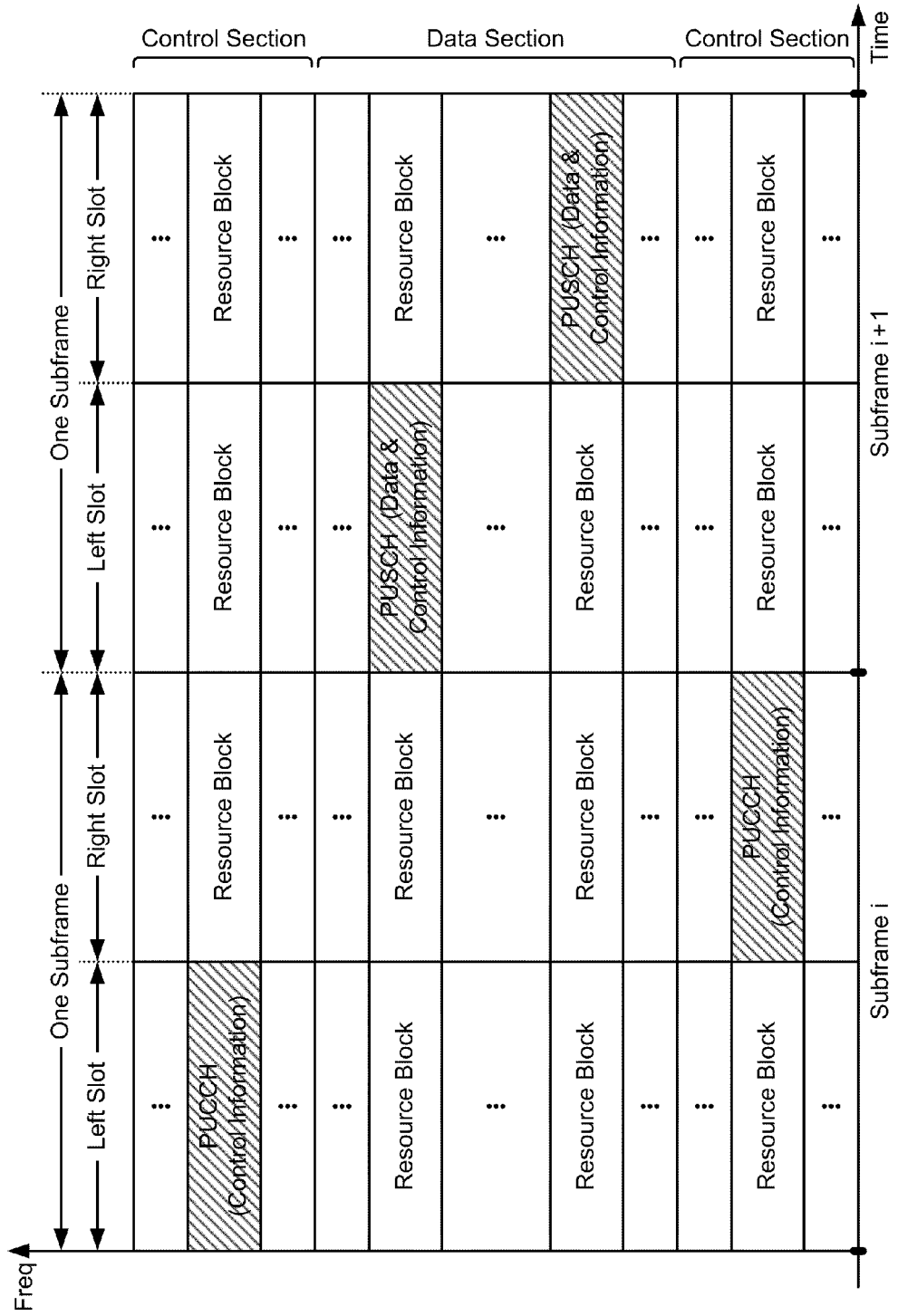
FIG. 3 is a block diagram conceptually illustrating an exemplary frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the uplink resources. For example, a control and a data channel, parallel control channels, and parallel data channels may be transmitted by a UE.

The PSC, SSC, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Referring back to FIG. 1, the wireless network 100 uses the diverse set of eNodeBs 110 (i.e., macro eNodeBs, pico eNodeBs, femto eNodeBs, and relays) to improve the spectral efficiency of the system per unit area. Because the wireless network 100 uses such different eNodeBs for its spectral coverage, it may also be referred to as a heterogeneous network. The macro eNodeBs 110a-c are usually carefully planned and placed by the provider of the wireless network 100. The macro eNodeBs 110a-c generally transmit at high power levels (e.g., 5 W-40 W). The pico eNodeB 110x and the relay 110r, which generally transmit at substantially lower power levels (e.g., 100 mW-2 W), may be deployed in a relatively unplanned manner to eliminate coverage holes in the coverage area provided by the macro eNodeBs 110a-c and improve capacity in the hot spots. The femto eNodeBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNodeB that may communicate with the other eNodeBs 110 of the wireless network 100 to perform resource coordination and coordination of interference management. The femto eNodeBs 110y-z typically also transmit at substantially lower power levels (e.g., 100 mW-2 W) than the macro eNodeBs 110a-c.

In operation of a heterogeneous network, such as the wireless network 100, each UE is usually served by the eNodeB 110 with the better signal quality, while the unwanted signals received from the other eNodeBs 110 are treated as interference. While such operational principals can lead to significantly sub-optimal performance, gains in network performance are realized in the wireless network 100 by using intelligent resource coordination among the eNodeBs 110, better server selection strategies, and more advanced techniques for efficient interference management.

A pico eNodeB, such as the pico eNodeB 110x, is characterized by a substantially lower transmit power when compared with a macro eNodeB, such as the macro eNodeBs 110a-c. A pico eNodeB will also usually be placed around a network, such as the wireless network 100, in an ad hoc manner. Because of this unplanned deployment, wireless networks with pico eNodeB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNodeBs 110a-c and the pico eNodeB 110x implies that, in a mixed deployment, the downlink coverage area of the pico eNodeB 110x will be much smaller than that of the macro eNodeBs 110a-c.

In the uplink case, however, the signal strength of the uplink signal is governed by the UE, and, thus, will be similar when received by any type of the eNodeBs 110. With the uplink coverage areas for the eNodeBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNodeB more difficult in the wireless network 100 than in a macro eNodeB-only homogeneous network, where the downlink and uplink handover boundaries are more closely matched.

If server selection is based predominantly on downlink received signal strength, as provided in the LTE Release 8 standard, the usefulness of mixed eNodeB deployment of heterogeneous networks, such as the wireless network 100, will be greatly diminished. This is because the larger coverage area of the higher powered macro eNodeBs, such as the macro eNodeBs 110a-c, limits the benefits of splitting the cell coverage with the pico eNodeBs, such as the pico eNodeB 110x, because, the higher downlink received signal strength of the macro eNodeBs 110a-c will attract all of the available UEs, while the pico eNodeB 110x may not be serving any UE because of its much weaker downlink transmission power. Moreover, the macro eNodeBs 110a-c will likely not have sufficient resources to efficiently serve those UEs. Therefore, the wireless network 100 will attempt to actively balance the load between the macro eNodeBs 110a-c and the pico eNodeB 110x by expanding the coverage area of the pico eNodeB 110x. This concept is referred to as range extension.

The wireless network 100 achieves this range extension by changing the manner in which server selection is determined Instead of basing server selection on downlink received signal strength, selection is based more on the quality of the downlink signal. In one such quality-based determination, server selection may be based on determining the eNodeB that offers the minimum path loss to the UE. Additionally, the wireless network 110 provides a fixed partitioning of resources equally between the macro eNodeBs 110a-c and the pico eNodeB 110x. However, even with this active balancing of load, downlink interference from the macro eNodeBs 110a-c should be mitigated for the UEs served by the pico eNodeBs, such as the pico eNodeB 110x. This can be accomplished by various methods, including interference cancellation at the UE, resource coordination among the eNodeBs 110, or the like.

In a heterogeneous network with range extension, such as the wireless network 100, in order for UEs to obtain service from the lower-powered eNodeBs, such as the pico eNodeB 110x, in the presence of the stronger downlink signals transmitted from the higher-powered eNodeBs, such as the macro eNodeBs 110a-c, the pico eNodeB 110x engages in control channel and data channel interference coordination with the dominant interfering ones of the macro eNodeBs 110a-c. Many different techniques for interference coordination may be employed to manage interference. For example, inter-cell interference control (ICIC) may reduce interference from cells in co-channel deployment. One ICIC mechanism is adaptive resource partitioning. Adaptive resource partitioning assigns subframes to certain eNodeBs. In subframes assigned to a first eNodeB, neighbor eNodeBs do not transmit. Thus, interference experienced by a UE served by the first eNodeB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNodeB for use exclusively by the first eNodeB. Protected subframes may also be referred to as "clean" subframes based on the lack of interference from neighboring eNodeBs. Prohibited subframes are subframes assigned to a neighbor eNodeB, and the first eNodeB is prohibited from transmitting data during the prohibited subframes. For example, a prohibited subframe of the first eNodeB may correspond to a protected subframe of a second interfering eNodeB. Thus, the first eNodeB is the only eNodeB transmitting data during the first eNodeB's protected subframe. Common subframes may be used for data transmission by multiple eNodeBs. Common subframes may also be referred to as "unclean" subframes because of the possibility of interference from other eNodeBs.

At least one protected subframe is statically assigned per period. In some cases only one protected subframe is statically assigned. For example, if a period is 8 milliseconds, one protected subframe may be statically assigned to an eNodeB during every 8 milliseconds. Other subframes may be dynamically allocated.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNodeBs and UEs over all of the time or frequency resources that increases or maximizes the total utility of the network. "Utility" may be defined as a function of user data rates, delays of quality of service (QoS) flows, and fairness metrics. Such a method can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed method decides resource usage based on the channel information from a certain set of nodes. Thus, the slowly-adaptive interference method may be deployed either using a central entity or by distributing the method over various sets of nodes/entities in the network.

In deployments of heterogeneous networks, such as the wireless network 100, a UE may operate in a dominant interference scenario in which the UE may observe high interference from one or more interfering eNodeBs. A dominant interference scenario may occur due to restricted association. For example, in FIG. 1, the UE 120y may be close to the femto eNodeB 110y and may have high received power for the eNodeB 110y. However, the UE 120y may not be able to access the femto eNodeB 110y due to restricted association and may then connect to the macro eNodeB 110c (as shown in FIG. 1) or to the femto eNodeB 110z also with lower received power (not shown in FIG. 1). The UE 120y may then observe high interference from the femto eNodeB 110y on the downlink and may also cause high interference to the eNodeB 110y on the uplink. Using coordinated interference management, the eNodeB 110c and the femto eNodeB 110y may communicate over the backhaul 134 to negotiate resources. In the negotiation, the femto eNodeB 110y agrees to cease transmission on one of its channel resources, such that the UE 120y will not experience as much interference from the femto eNodeB 110y as it communicates with the eNodeB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNodeBs. The eNodeBs in a synchronous system are presumptively synchronized across the system. However, for example, considering a UE that is a distance of 5 km from the macro eNodeB, the propagation delay of any downlink signals received from that macro eNodeB would be delayed approximately 16.67 μs (5 km÷3×108, i.e., the speed of light, 'c'). Comparing that downlink signal from the macro eNodeB to the downlink signal from a much closer femto eNodeB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 4:
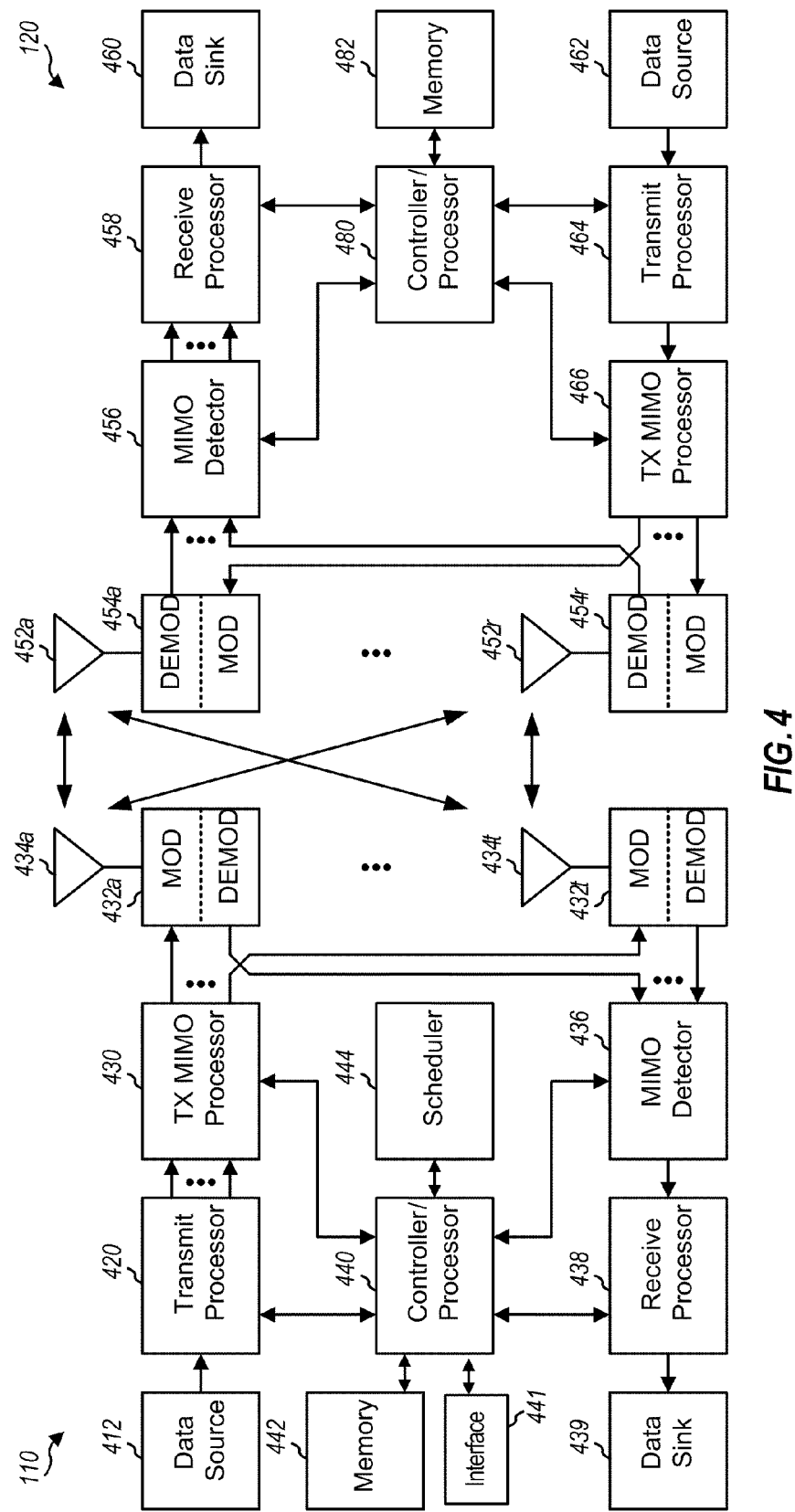
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. An interface 441 enables communications with other base stations. Such communications between base stations may be through a protocol interface such as X2, defined in 3GPP or through a different interface such as a proprietary interface.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of processes for the techniques described herein. The memories 442 and 482 may store data and program codes for the base station 110 and the UE 120, respectively. A scheduler 444 may schedule UEs for data transmission on the downlink and/or uplink.

As discussed above, the need for range expansion arises whenever some UEs are not associated with a base station offering the highest downlink received power. For instance, in a macro-pico network, it may be more desirable to allow a UE to connect to a pico cell even though a neighboring macro cell has higher received power, because it is more beneficial for the network to offload the macro cell traffic. In another example, in a macro-femto network, a UE may desire to associate with the macro cell even though a neighboring femto cell is much stronger. This situation could arise because the femto cell has restricted association in place and the UE is not part of the closed subscriber group (CSG).

Figure 5:
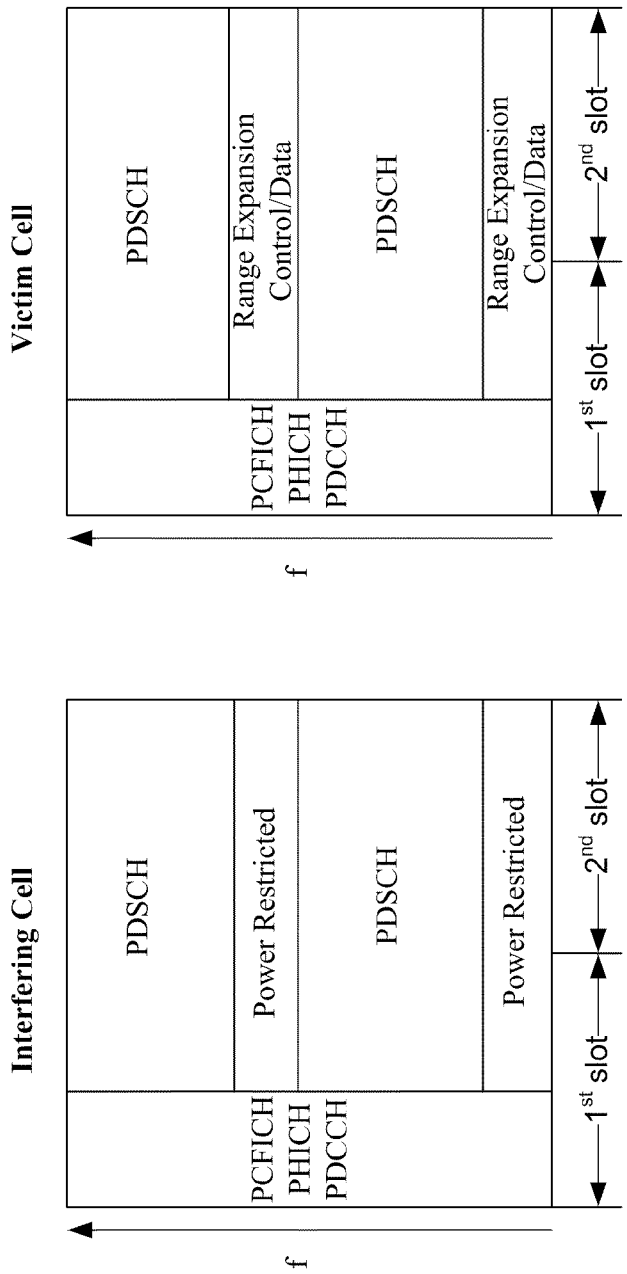
FIG. 5 is a diagram illustrating range expansion with power restriction.

FIG. 5 is a diagram illustrating range expansion with power restriction. Range expansion enhances the system performance of wireless networks. Heterogeneous networks that may benefit from range expansion techniques include:
  macro-pico network, where pico cells are open to all UEs;
  macro-femto network, where femto cells enforce restricted association;
  femto-femto network, where femto cells enforce restricted association;
  macro-relay network, where the relays are open to all UEs;
  macro-femto relay network, where femto relays enforce restricted association; and
  more complex systems involving different combinations of the above.

In such situations, there is a need for resource partitioning between different cells, such that UEs served by a cell with lower receiver power (the victim cell) do not get overwhelmed by interfering cells. Although examples below discuss the scenario where a lower power cell (such as pico or femto cell) is the victim cell and a macro cell is the interfering cell, the teachings below are equally applicable when a higher power cell (such as a macro cell) is the victim cell and a proximate lower power cell (such as a pico or femto cell) is the interfering cell.

In the resource partitioning, a UE may receive communications from a victim cell on a resource coordinated with the interfering cell. The resource partitioning can be done in time domain or in frequency domain. For example, in LTE-A, some subframes can be allocated to a first cell (the interfering cell), while some others (possibly overlapping) subframes can be allocated to a second cell (the victim cell). As such, a UE served by the second cell would see no or little interference from the first cell on some subframes. This is because the first cell is "power restricted" on subframes allocated to the second cell. Herein, the term "power restricted" indicates the situation where a cell transmits at no power or reduced power on a certain resource to reduce interference to other cells. For example, in a macro-pico network, a macro cell may reduce its power to the same level as a pico cell. In another example, a macro cell may cease transmitting data on certain resources but continue to transmit cell-specific reference signals (CRS), synchronization signals (PSS/SSS), and broadcast channels (PBCH).

Another option is to do resource partitioning in the frequency domain. In this case, the first cell is not restricted on the entire subframe, but is instead power restricted on certain resource blocks (RBs), subbands in some subframes, or other resource. As a result, a UE served by the second cell would see no or little interference from the first cell on these RBs or subbands.

Referring to FIG. 5, the diagram depicts the scenario where the macro cell (i.e., interfering cell) is power restricted in some RBs in the physical downlink shared channel (PDSCH) resource region so that the range expansion control and/or data may be transmitted from the low-power cell (i.e., victim cell). In these RBs, range expansion UEs see little downlink interference from macro cells, and therefore are able to receive control and data from the victim cell with good signal to interference plus noise ratio (SINR).

An example of frequency domain range expansion is in the macro-pico or macro-relay co-existence scenarios. In this case, it may be desirable that more UEs are offloaded from the macro to pico cells or relays. Therefore, a UE connected to a low-power node (victim cell) may see dominant interference from one or many macro cells (interfering cell). In other words, the received power of the neighboring interfering cells is strong compared to that of the serving victim cell.

To facilitate successful decoding at the UE served by the victim cell, it is important that the UE sees little or no interference from the interfering cells when it is receiving. In LTE-A, one possible design is to let the interfering cells be power restricted in certain RBs/subbands in which the UE is expected to receive from the victim cell.

Suppose that low-power nodes are allowed to transmit in subframe k. The macro cells may be power restricted in a number of RBs/subbands in the PDSCH region for the low-power nodes to schedule UEs that need range expansion. In the other RBs where the macro cells are not power restricted, the low-power nodes can transmit to UEs that do not need range expansion.

If the low-power node is a relay and subframe k is an access link subframe, the macro cells may be power restricted in a number of RBs/subbands in the PDSCH region for the relays to schedule UEs that need range expansion in the subframe k. In the other RBs where the macro cells are not power restricted, the relays can transmit to UEs that do not need range expansion. For example, as shown in FIG. 5, the Victim Cell transmissions of standard control channels (e.g., PCFICH, PHICH, PDCCH, and PDSCH) are intended for UEs which are close to the Victim Cell and are able to receive control and data from the Victim Cell with good SNR and without experiencing interference from the interfering cell. The Victim Cell transmissions of Range Expansion Control/Data are intended for UEs which do experience interference and thus need to communicate with the Victim Cell when the Interfering Cell is power restricted. The multiple slots for Range Expansion Data may be used for multiple UEs.

Figure 6:
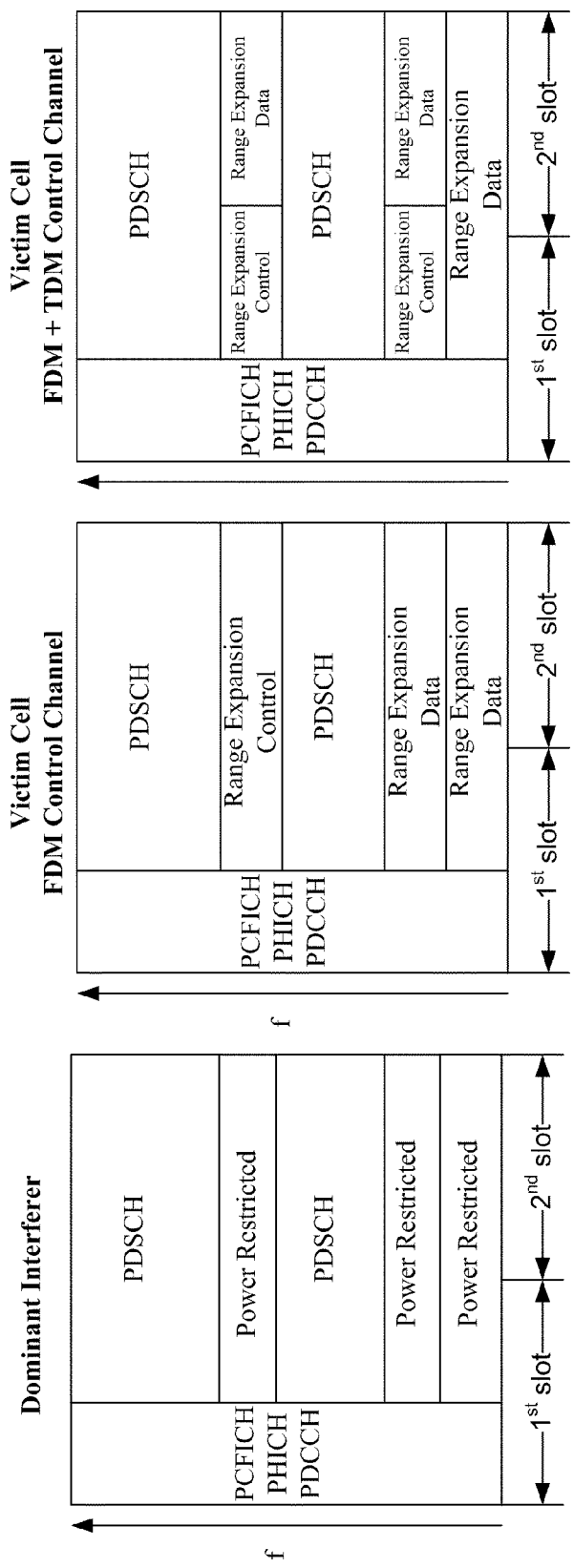
FIG. 6 is another diagram illustrating range expansion with power restriction.

FIG. 6 is another diagram illustrating range expansion with power restriction. FIG. 6 is discussed with respect to the control channel, the power restricted region, the data channel, cell-specific reference signals (CRS), and UE association.

Control Channel

The control channel for frequency domain range expansion may be performed in a frequency division multiplexing (FDM) manner, or in an FDM and time division multiplexing (TDM) manner. FIG. 6 depicts the FDM and FDM+TDM design of range expansion control. For the FDM design, the range expansion control will span a number of full RBs, in which the range expansion physical downlink control channel (PDCCH) and physical hybrid ARQ indicator channel (PHICH) are multiplexed. For the FDM+TDM design, the range expansion control will span a number of RBs in frequency domain and a portion of the orthogonal frequency division multiplexing (OFDM) symbols of these RBs in time domain. If an FDM+TDM design is used, the remaining OFDM symbols of the RBs used for range expansion control may be used as range expansion data channel for LTE-A UEs. In these examples, the range expansion control and data transmissions do not experience strong interference from the dominant interferer due to the power restriction on the dominant interferer.

Similar to FIG. 5 discussed above, as shown in FIG. 6, the Victim Cell transmissions of standard control channels (e.g., PCFICH, PHICH, PDCCH, and PDSCH) are intended for UEs which are close to the Victim Cell and are able to receive control and data from the Victim Cell with good SINR and without experiencing interference from the interfering cell. They are also intended for the case where the Interfering Cell is able to help the Victim Cell to transmit control information to the destination UE (for example, the Victim Cell and the Interfering Cell transmit the same control information at the same time). Then, control information for the Victim Cell is being sent over the control region for the Interfering Cell. In such a case, an Interfering Cell may transmit control information to the UE on behalf of the Victim Cell. The Victim Cell may also coordinate with the Interfering Cell over the backhaul to simultaneously transmit substantially similar control information to the UE using the same cell ID. In such a scenario the control information for the Victim Cell and Interfering Cell overlap. Such overlapping transmissions are enabled by the victim cell and interfering cell having the same physical cell ID. In another example, the victim cell and interfering cell have different physical cell IDs, but may have a common reference signal offset.

The Victim Cell transmissions of Range Expansion Control/Data are intended for UEs which do experience interference and thus need to communicate with the Victim Cell when the Interfering Cell is power restricted. The multiple slots for Range Expansion Data or Range Expansion Control may be used for multiple UEs.

Power Restricted Region

The power restricted region can be semi-static or dynamic. A UE may be informed on the power restricted region through the radio resource control (RRC) layer or dynamically through communication in the PDCCH. The information that an interfering cell is power restricted in a certain region can be transparent to the UE. Alternatively, the region information can be conveyed to the UE by the serving cell.

The size resolution of the power restricted region can be divided per RB or per subband. Because the power restricted regions depend on UE distribution, different eNodeBs may share the UE information via backhaul in order to configure the power restricted region.

Data Channel

The range expansion data/control channel may be full RBs or a fraction of an RB depending on the design of range expansion control. As shown in FIG. 6, the control information and the data from a Victim Cell may be frequency division multiplexed (FDM) such that the control information is transmitted on a first set of frequencies during a subframe in the PDSCH region and the data are transmitted on a second set of frequencies during the subframe in the PDSCH region. The second set of frequencies are nonoverlapping with the first set of frequencies. The first set of frequencies and the second set of frequencies each correspond to at least one full resource block. As shown in FIG. 6, when the Victim Cell employs FDM and TDM techniques, the control information and the data are frequency division multiplexed and time division multiplexed such that the control information and the data span different portions of the OFDM symbols in the region within at least one full resource block. In one configuration, within one subframe, the control information spans at least a subset of the OFDM symbols of the first slot in the one subframe and the data spans at least a subset of the OFDM symbols of the second slot adjacent the first slot in the one subframe (i.e., range expansion control is transmitted in the 1st slot and range expansion data in the 2nd slot). The subset of the OFDM symbols of the first slot excludes the region of the PDCCH.

CRS

When a dominant interferer is power restricted in the control or data region of range expansion UEs, its cell-specific reference signals (CRS) may be power restricted or transmitted at normal power. The range expansion UE may rely on CRS or UE-specific resource signals (UE-RS) transmitted by the victim cell for demodulation. The range expansion UE may use a UE-RS as long as the victim cell sends the UE-RS along with the data. If the victim cell transmits CRS and the dominant interferer's CRS is power restricted, the victim UE may use the CRS directly or perform CRS interference cancellation to remove the CRS signals from the dominant interferer. Otherwise, if the dominant interferer's CRS is not power restricted, the victim UE may perform CRS interference cancellation to remove the CRS signals from the dominant interferers if the victim UE is able to do so.

UE Association

Frequency domain range expansion may potentially cause desense at the UE receiver if the signal strength of the dominant interferers is much larger than that of the serving cell of the range expansion UE. In this case, the UE may also not be able to perform interference cancellation to remove the interfering signal. To protect against this scenario, a UE may set a signal strength difference threshold (e.g., X dB), such that the association method ensures that a UE is not associated with a cell if the dominant interferers of the UE are more than X dB stronger than the received signal of this cell. This signal strength threshold may also be converted into a geometric limit. The signal strength may measure downlink signal strength and/or uplink signal strength.

In addition, for UEs that rely on CRS interference cancellation, the geometry of the range expansion UE has to be above a certain threshold (Y dB) to ensure the successful cancellation of interference from dominant interferers.

In another example, different cells may negotiate the association of a UE, and whether range expansion should be applied to the UE, based on the measured sounding reference signal (SRS) from the UE. A difference in SRS signal strength between two cells may be compared to a threshold (e.g., Z dB) to help determine which cell is the preferred serving base station. The threshold may be a function of the power classes of the two cells. One base station may exchange metric information received from a UE with other base stations for resource management (for example in the frequency domain for control and/or data channels).

Time Domain Range Expansion

Figure 7:
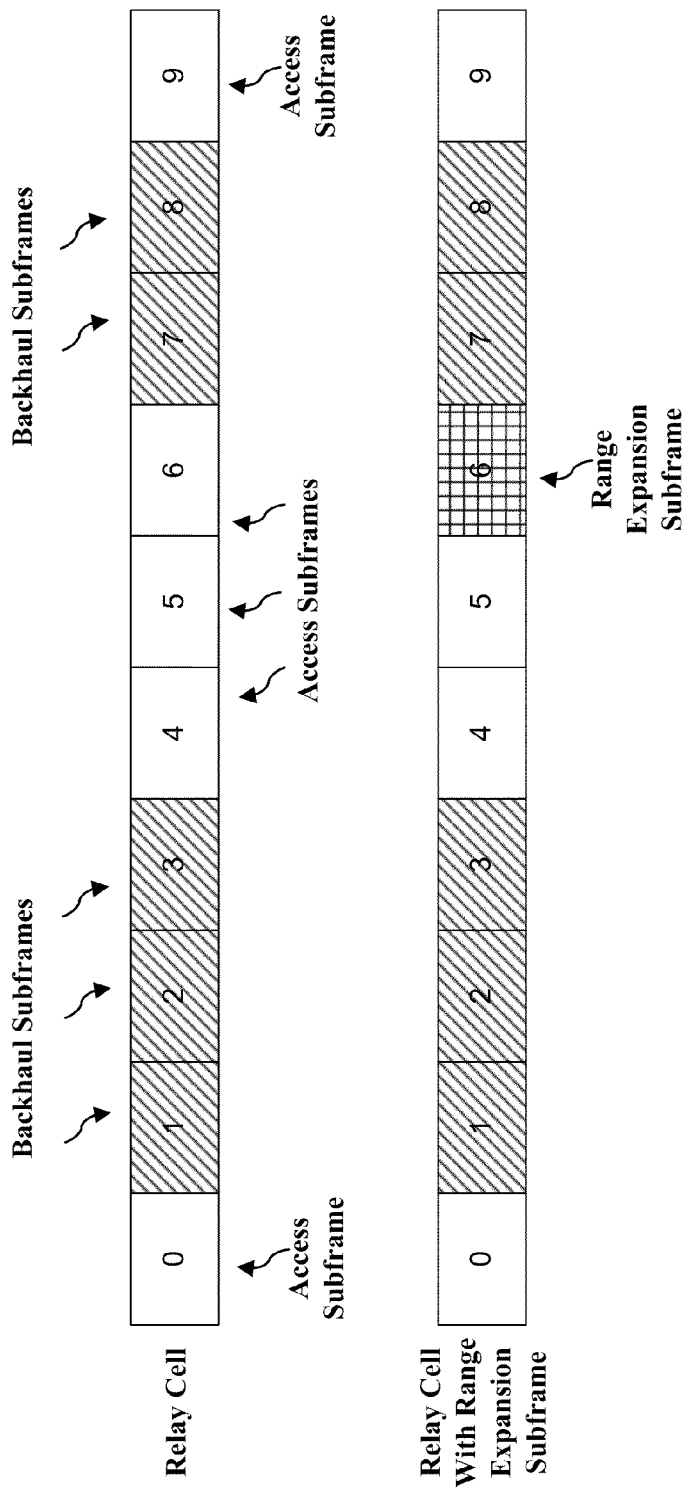
FIG. 7 is a diagram illustrating time domain range expansion.

FIG. 7 is a diagram illustrating time domain range expansion for relays. In LTE-A relay design, the access and backhaul subframes are TDM'ed. Backhaul link subframes are for the relay to communicate with macro eNodeBs. Access link subframes are for the relay to communicate with UEs. Instead of allocating some RBs/subbands of access link subframes for range expansion, another approach is to allocate an entire access link subframes for range expansion for distant UEs.

FIG. 7 depicts one example of time domain range expansion for relays. Subframes 1, 2, 3, 7, 8 are backhaul subframes, and subframes 0, 4, 5, 6, 9 are access subframes. To enable range expansion, subframe 6 is allocated as a range expansion access subframe, where macro cells (or dominant interferers in general) are power restricted so that relays can serve distant UEs.

In the range expansion subframe, the UE receiver may need to perform interference cancellation to remove the CRS, primary synchronization signal (PSS), secondary synchronization signal (SSS), and physical broadcast channel (PBCH) transmitted by macro cells, because they may still be transmitted at normal power. After the removal of macro interference, the victim cells may reuse the Rel-8 control and data channel. Alternatively, macro cells may configure a multicast/broadcast single frequency network (MBSFN) subframe, such that the range expansion UEs see no interference at least in the PDSCH region.

One issue of time domain range expansion is that the range expansion subframes in downlink and uplink communications may not be aligned. In fact, they may even be allocated with different periodicity. This means that events such as an uplink grant and corresponding uplink data and uplink data and a corresponding downlink acknowledgement (i.e., "uplink grant→uplink data→PHICH") may not be 4 ms apart. The same issue applies to the time offset between downlink data and a corresponding uplink acknowledgement (i.e., "downlink data→uplink ACK/NACK"). Therefore, there is a need for cross-subframe control. For example, the PDCCH in subframe k needs to be able to control an uplink subframe other than k+4.

A frequency and time domain approach to enable range expansion is provided. Range expansion is a key technology to enhance system throughput in both homogeneous and heterogeneous networks. While macro-pico and macro-relay systems have been provided as examples, it should be noted that the described technique is applicable in other scenarios where range expansion is desired. In addition, despite the downlink centric description, range expansion can also be applied similarly in uplink communications in both time domain (subframe level) and frequency domain (RB/subband level).

Figure 8:
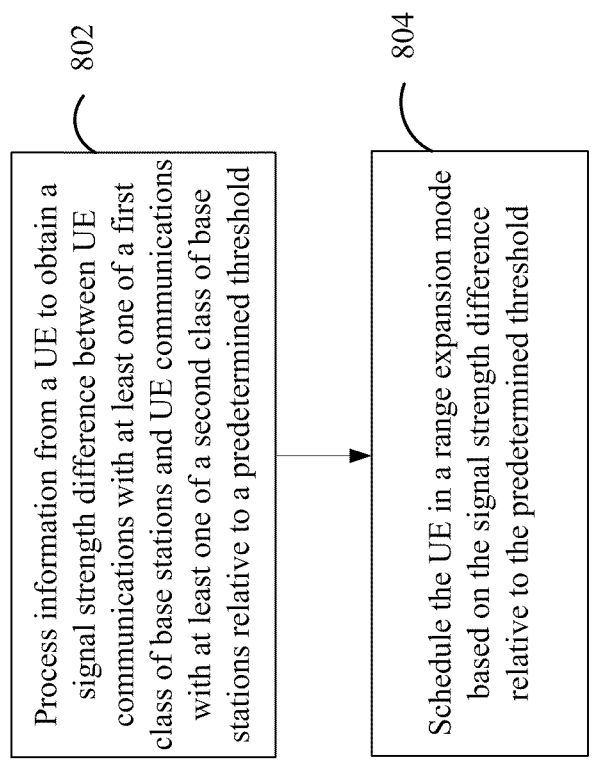
FIG. 8 is a diagram illustrating range expansion according to one aspect of the present disclosure.

FIG. 8 is a diagram illustrating range expansion according to one aspect of the present disclosure. As shown in block 802, information is received from a UE indicating a signal strength difference between at least one of a first class of base stations and at least one of a second class of base stations. As shown in block 804, the UE is scheduled in a range expansion mode based on the signal strength difference relative to a predetermined threshold. The range expansion mode enables the UE to receive control information from at least one of the second class of base stations in a first data region of the first class of base stations.

In one configuration, a base station 110 is configured for wireless communication including means for processing information from a user equipment (UE) to obtain a signal strength difference between UE communications with at least one of a first class of base stations and UE communications with at least one of a second class of base stations relative to a predetermined threshold. The base station may also be configured for scheduling the UE in a range expansion mode based on the signal strength difference relative to the predetermined threshold. In one aspect, the aforementioned means may be the antenna 434, the controller/processor 440, the memory 442, transmit processor 420, interface 441, and/or scheduler 444. configured to perform the functions recited by the aforementioned means. In another aspect, the aforementioned means may be a module or any apparatus configured to perform the functions recited by the aforementioned means.

As shown in block 802 of FIG. 8, a system processes information from a user equipment (UE) to obtain a signal strength difference between UE communications with at least one of a first class of base stations and UE communications with at least one of a second class of base stations relative to a predetermined threshold. In block 804 the system schedules the UE in a range expansion mode based on the signal strength difference relative to the predetermined threshold. The range expansion mode enables the UE to receive communications from at least one of the second class of base stations on a resource coordinated with at least one of the first class of base stations.

Those of skill would further appreciate that the various illustrative logical blocks, modules, circuits, and steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   processing information from a user equipment (UE) to obtain a signal strength difference between UE communications with at least one of a first class of base stations and UE communications with at least one of a second class of base stations;
   comparing the signal strength difference to a predetermined threshold; and
   scheduling the UE in a range expansion mode based on the comparison of the signal strength difference to the predetermined threshold, the range expansion mode enabling the UE to receive communications from at least one of the second class of base stations on a resource coordinated with at least one of the first class of base stations, wherein the resource comprises a predetermined time-frequency resource in a data region of the at least one of the first class of base stations.

2. The method of claim 1 in which the information includes UE-measured downlink reference signal power and a UE-transmitted sounding reference signal.

3. The method of claim 1 in which the information is received from another base station.

4. The method of claim 3 in which processing the information comprises exchanging the information with other base stations for resource management in at least a frequency domain for at least one of a control channel or data channel.

5. The method of claim 1 in which the at least one of the first class of base stations is power restricted in the resource.

6. The method of claim 1 in which the at least one of the first class of base stations and the at least one of the second class of base stations have either:
   a same physical cell ID or
   a different physical cell ID and a same common reference signal offset.

7. The method of claim 1 in which the first class of base stations includes macro base stations and the second class of base stations includes pico base stations, femto base stations, or relay base stations.

8. The method of claim 1 in which the second class of base stations includes macro base stations and the first class of base stations includes pico base stations, femto base stations, or relay base stations.

9. The method of claim 1 in which control information from at least one of the second class of base stations to the UE and control information from the at least one of the first class of base stations to the UE are substantially the same.

10. The method of claim 1 in which the communications include a UE specific reference signal.

11. An apparatus operable for wireless communication, the apparatus comprising:
   means for processing information from a user equipment (UE) to obtain a signal strength difference between UE communications with at least one of a first class of base stations and UE communications with at least one of a second class of base stations;
   means for comparing the signal strength difference to a predetermined threshold; and
   means for scheduling the UE in a range expansion mode based on the comparison of the signal strength difference to the predetermined threshold, the range expansion mode enabling the UE to receive communications from at least one of the second class of base stations on a resource coordinated with at least one of the first class of base stations, wherein the resource comprises a predetermined time-frequency resource in a data region of the at least one of the first class of base stations.

12. A computer program product operable to wirelessly transmit data over a communications link, comprising:
   a non-transitory computer-readable medium having program code recorded thereon, the program code comprising:
      program code to process information from a user equipment (UE) to obtain a signal strength difference between UE communications with at least one of a first class of base stations and UE communications with at least one of a second class of base stations;
      program code to compare the signal strength difference to a predetermined threshold; and
      program code to schedule the UE in a range expansion mode based on the comparison of the signal strength difference to the predetermined threshold, the range expansion mode enabling the UE to receive communications from at least one of the second class of base stations on a resource coordinated with at least one of the first class of base stations, wherein the resource comprises a predetermined time-frequency resource in a data region of the at least one of the first class of base stations.

13. An apparatus operable to wirelessly transmit data over a communications link, the apparatus comprising:
   at least one processor; and
   a memory coupled to the at least one processor, the at least one processor being configured:
      to process information from a user equipment (UE) to obtain a signal strength difference between UE communications with at least one of a first class of base stations and UE communications with at least one of a second class of base stations;
      to compare the signal strength difference to a predetermined threshold; and
      to schedule the UE in a range expansion mode based on the comparison of the signal strength difference to the predetermined threshold, the range expansion mode enabling the UE to receive communications from at least one of the second class of base stations on a resource coordinated with at least one of the first class of base stations, wherein the resource comprises a predetermined time-frequency resource in a data region of the at least one of the first class of base stations.

14. The apparatus of claim 13 in which the information includes UE-measured downlink reference signal power and a UE-transmitted sounding reference signal.

15. The apparatus of claim 13 in which the information is received from another base station.

16. The apparatus of claim 15 in which the at least one processor being configured to process the information comprises the at least one processor being configured to exchange the information with other base stations for resource management in at least a frequency domain for at least one of a control channel or data channel.

17. The apparatus of claim 13 in which the at least one of the first class of base stations is power restricted in the resource.

18. The apparatus of claim 13 in which the at least one of the first class of base stations and the at least one of the second class of base stations have either:
   a same physical cell ID or
   a different physical cell ID and a same common reference signal offset.

19. The apparatus of claim 13 in which the first class of base stations includes macro base stations and the second class of base stations includes pico base stations, femto base stations, or relay base stations.

20. The apparatus of claim 13 in which the second class of base stations includes macro base stations and the first class of base stations includes pico base stations, femto base stations, or relay base stations.

21. The apparatus of claim 13 in which control information from at least one of the second class of base stations to the UE and control information from the at least one of the first class of base stations to the UE are substantially the same.

22. The apparatus of claim 13 in which the communications include a UE specific reference signal.

* * * * *